(12) United States Patent
Hoelzemann et al.

(10) Patent No.: US 8,630,154 B2
(45) Date of Patent: Jan. 14, 2014

(54) APPARATUS COMPRISING A PICKUP PROVIDING MULTIPLE BEAMS

(75) Inventors: Herbert Hoelzemann, Villingen (DE); Stephan Knappmann, Zimmern ob Rottweil (DE)

(73) Assignee: Thomson Licensing, LLC, Issy les Moulineaux (FR)

( * ) Notice: Subject to any disclaimer, the term of this patent is extended or adjusted under 35 U.S.C. 154(b) by 0 days.

(21) Appl. No.: 13/697,075

(22) PCT Filed: May 9, 2011

(86) PCT No.: PCT/EP2011/057365
§ 371 (c)(1),
(2), (4) Date: Nov. 9, 2012

(87) PCT Pub. No.: WO2011/141393
PCT Pub. Date: Nov. 17, 2011

(65) Prior Publication Data
US 2013/0058199 A1 Mar. 7, 2013

(30) Foreign Application Priority Data
May 11, 2010 (EP) ..................................... 10305496

(51) Int. Cl.
*G11B 7/135* (2012.01)
(52) U.S. Cl.
USPC .................................. 369/44.37; 369/124.03
(58) Field of Classification Search
None
See application file for complete search history.

(56) References Cited

U.S. PATENT DOCUMENTS

| 5,191,571 | A | * | 3/1993 | Fukumoto et al. | 369/44.37 |
| 5,239,529 | A | * | 8/1993 | Tobita et al. | 369/47.32 |
| 5,648,950 | A | * | 7/1997 | Takeda et al. | 369/110.03 |
| 5,892,744 | A | * | 4/1999 | Ohba | 369/44.37 |
| 5,923,626 | A | * | 7/1999 | Richter | 369/44.23 |
| 6,788,628 | B2 | * | 9/2004 | Katayama | 369/44.37 |
| 7,480,228 | B2 | * | 1/2009 | Mori | 369/112.07 |

(Continued)

FOREIGN PATENT DOCUMENTS

EP    2009626    12/2008

OTHER PUBLICATIONS

Search Rept:Jul. 27, 2011.

*Primary Examiner* — Peter Vincent Agustin
(74) *Attorney, Agent, or Firm* — International IP Law Group, PLLC

(57) ABSTRACT

The apparatus includes a pickup for reading data from a super-resolution optical disc, the pickup comprising a laser for generating a main beam, a first and a second satellite beam, the two satellite beams each having a radial offset with regard to the main beam, a third satellite beam following the first satellite beam, having the same radial offset as the first satellite beam, and a fourth satellite beam following the second satellite beam, having the same radial offset as the second satellite beam, for providing a crosstalk correction of the HF data signal. The track pitch between adjacent tracks of the optical disc is particularly below the diffraction limit of the pickup, and the light intensity of each of the first and second satellite beams and of the main beam is sufficient to provide a super-resolution effect on the optical disc and the light intensity of each of the third and fourth satellite beams is not sufficient to provide the super-resolution effect. The track pitch between adjacent tracks of the optical disc is advantageously below the diffraction limit of the pickup.

16 Claims, 6 Drawing Sheets

(56) References Cited

U.S. PATENT DOCUMENTS

| | | |
|---|---|---|
| 2002/0003755 A1* | 1/2002 | Fujita et al. ................ 369/44.23 |
| 2002/0075775 A1* | 6/2002 | Katayama ................. 369/44.37 |
| 2003/0026179 A1* | 2/2003 | Nagahara et al. .......... 369/44.37 |
| 2003/0053395 A1* | 3/2003 | Kadowaki et al. ....... 369/112.12 |
| 2003/0112723 A1 | 6/2003 | Ceshkovsky |
| 2004/0037177 A1* | 2/2004 | Buchler .................... 369/44.28 |
| 2004/0246834 A1* | 12/2004 | Seong ....................... 369/44.37 |
| 2005/0180293 A1* | 8/2005 | Ueyama et al. .......... 369/112.05 |
| 2005/0185539 A1* | 8/2005 | Shimano et al. ........... 369/44.37 |
| 2008/0074966 A1* | 3/2008 | Ono et al. ................. 369/44.37 |
| 2009/0103417 A1* | 4/2009 | Tanahashi et al. ....... 369/109.01 |
| 2009/0147658 A1* | 6/2009 | Katayama ................ 369/112.03 |
| 2013/0003515 A1* | 1/2013 | Knappmann et al. .... 369/112.03 |
| 2013/0058199 A1* | 3/2013 | Hoelzemann et al. ..... 369/44.37 |

\* cited by examiner

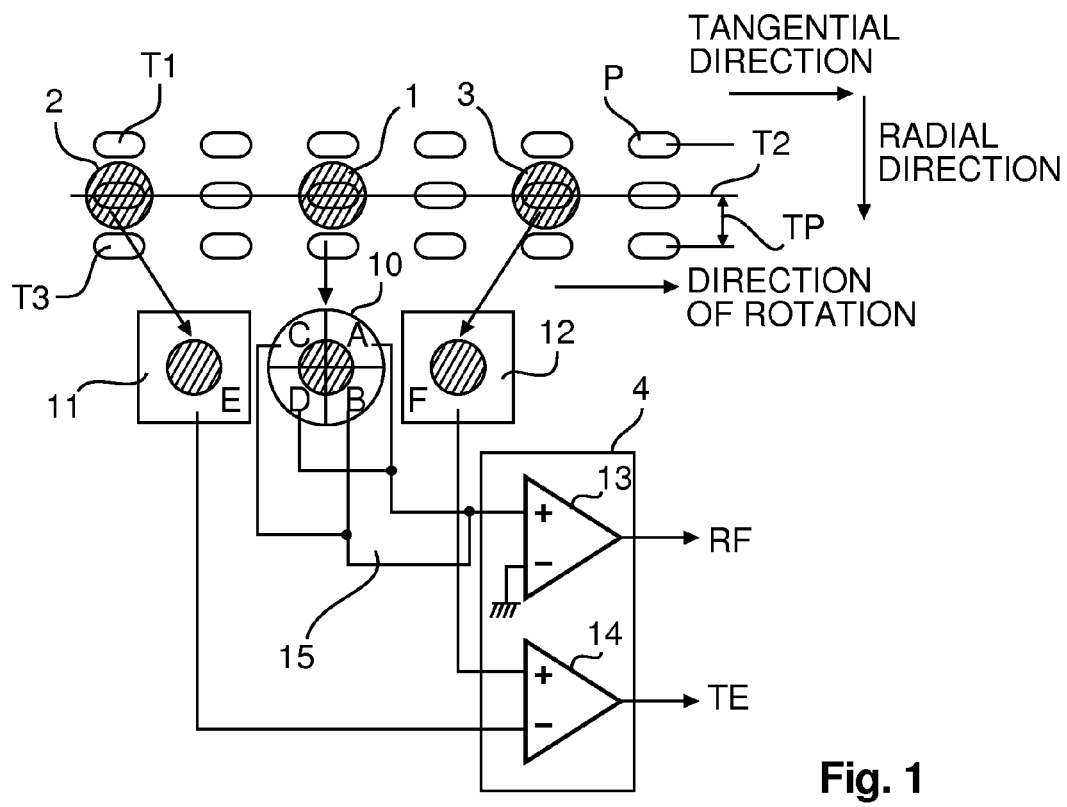
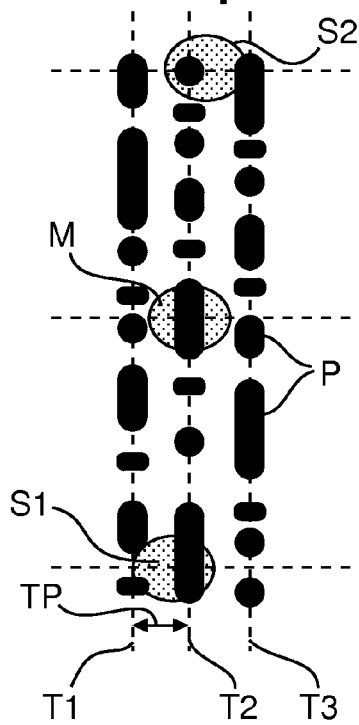
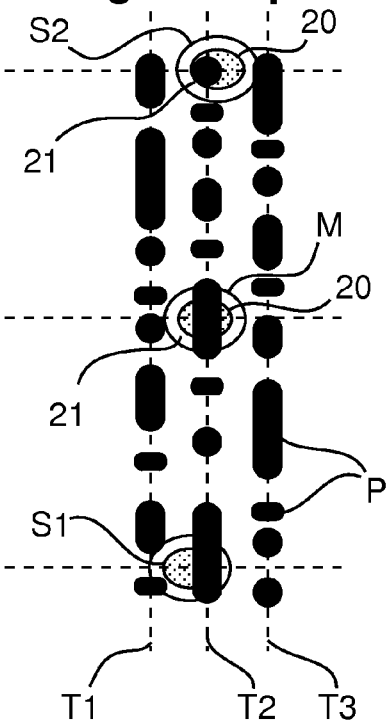
Fig. 2a      Fig. 2b ably and a photo-detector for detecting the reflected light
APPARATUS COMPRISING A PICKUP PROVIDING MULTIPLE BEAMS This application claims the benefit, under 35 U.S.C. §365 of International Application PCT/EP2011/057365, filed May 9, 2011, which was published in accordance with PCT Article 21(2) on Nov. 17, 2011 in English and which claims the benefit of European patent application No. 10305496.1, filed May 11, 2010.

FIELD OF THE INVENTION

The present invention relates to an apparatus comprising a pickup with a laser and an objective lens for focusing a main beam and several satellite beams onto an optical disc.

BACKGROUND OF THE INVENTION

Optical storage media are media in which data are stored in an optically readable manner, for example by means of a pickup comprising a laser for illuminating the optical storage medium and a photo-detector for detecting the reflected light of the laser beam when reading the data. In the meanwhile a large variety of optical storage media are available, which are operated with different laser wavelength, and which have different sizes for providing storage capacities from below one Gigabyte up to about 50 Gigabyte (GB). Digital data are stored in these media along tracks in one or more layers of the media.

The storage medium with the highest data capacity is at present the Blu-Ray disc, which allows to store up to 50 GB on a dual layer disc. Available formats are at present for example read-only BD-ROM, re-writable BD-RE and write once BD-R discs. For reading and writing of a Blu-Ray disc, a pickup with a laser wavelength of 405 nm is used. On the Blu-Ray disc a track pitch of 320 nm and a mark length from 2 T to 8 T, maximum 9 T, is used, where T is the channel bit length, which corresponds with a minimum mark length of 138-160 nm.

The diffraction limit of optical instruments as described by the Abbe theory is about lambda/2 NA, which is 238 nm for a Blu-Ray type pickup with a wavelength lambda=405 nm and a numerical aperture NA=0.85. This theoretical minimal detectable length from the diffraction theory is corresponding to a period of the pattern function, which is formed of a pit and of a land having the same length. The smallest detectable element of such a system is a pit or a land having a length of about lambda/4 NA, which corresponds for a Blu-Ray type pickup with a length of 120 nm.

New optical storage media with a super-resolution structure offer the possibility to increase the data density of the optical storage medium by a factor of two to four in one dimension as compared with the Blu-Ray disc. This is possible by including a nonlinear layer, which is placed above a data layer of the optical storage medium, and which significantly reduces the effective size of a light spot used for reading from or writing to the optical storage medium. The nonlinear layer can be understood as a mask layer because it is arranged above the data layer and for some specific materials only the high intensity center part of a laser beam can penetrate the mask layer. Therefore, the super-resolution effect allows to record and read data stored in marks of an optical disc, which have a size below the optical resolution limit of lambda/4 NA of a corresponding optical pickup. Super-resolution optical discs comprising a super-resolution near-field structure are known for example from WO 2005/081242, US 2004/0257968 and WO 2004/032123.

The super-resolution effect allows increasing the resolution of the pickup for reading of the marks on an optical disc, but does not allow reducing the track pitch.

A pickup providing three light beams with a main beam and two satellite beams for providing a tracking signal for reading data from an optical storage medium is known since the introduction of the CD. In these arrangements, the light intensity of the satellite beams is much smaller than the intensity of the main beam. An apparatus of this kind is described for example in U.S. Pat. No. 6,137,758, which uses a detector unit with a main detector for providing a data signal and a pair of satellite detectors for detecting the satellite beams as reflected from the optical storage medium for providing a tracking error signal. The two satellite detectors allow distinguishing between a CD and a DVD in addition to the generation of a tracking signal. The apparatus is in particular designed for optical discs having a track pitch between adjacent tracks, which is below the diffraction limit of the pickup. An apparatus comprising a pickup providing a main beam and two satellite beams for reading data from a super-resolution optical disc is known for example from EP-B-2009627.

WO 2006/004338 describes an apparatus comprising a pickup for reading data from a super-resolution optical disc, wherein the pickup provides a first beam having a light intensity being sufficient for providing a super-resolution effect and a second beam following the first beam having not the light intensity for providing the super-resolution effect. By taking into account a temporal delay between the reflected signal of the first beam and the reflected signal of the second beam, reflected light outside of a reproduction beam spot of the super-resolution area is excluded, thereby improving the reproduction signal characteristics of the HF-signal.

In the publication Wu and Chong, Applied Optics 36, 1997, pages 6668-6677, a method for reading data from a super-resolution optical disc is described, wherein an assistant beam with a modified beam profile is used to optimize the thermal aperture on the super-resolution optical disc.

SUMMARY OF THE INVENTION

The apparatus comprises a pickup for reading data from a super-resolution optical disc, wherein the pickup includes a laser for generating a main beam and a first and a second satellite beam, the two satellite beams having each a radial offset with regard to the main beam, and wherein the two satellite beams and the main beam are focused by an objective lens onto the optical disc. The reflected light from the optical disc is guided onto two detector units for providing a HF data signal. In addition, the pickup generates a third satellite beam following the first satellite beam and a fourth satellite beam following the second satellite beam, the third satellite beam having the same radial offset as the first satellite beam and the fourth satellite beam having the same radial offset as the second satellite beam, for providing a crosstalk correction of the HF data signal.

In a further aspect of the invention, the light intensity of each of the first and second satellite beams is sufficient to provide a super-resolution effect on the optical disc, and is e.g. each in the order of 70% to 100% of the light intensity of the main beam, and the light intensity of each of the third and fourth satellite beams is not sufficient to provide a super-resolution effect on the optical disc, and is e.g. smaller than 70% of the intensity of the main beam.

In another aspect of the invention, the pickup comprises two detector units, which are sensitive to different polarization states of light being reflected from the optical disc, wherein a first detector unit is sensitive for detecting reflected light originating from the main beam and the first and second satellite beams, but not from the third and fourth satellite beams, and wherein the second detector unit is sensitive for the third and fourth satellite beams, but not for the main beam and the first and second satellite beams.

The pickup includes in a preferred embodiment a diffractive granting for generating three beams from an initial laser beam generated by the laser of the pickup, a beam splitting element for splitting each of the three beams into two beams having orthogonal polarization states, and a polarizing beam splitter, which is arranged for directing reflected light of the main beam and the first and second satellite beams to the first detector unit and for directing reflected light of the third and fourth satellite beams to the second detector unit.

In a further aspect of the invention, advanced signal processing is applied, to reduce distortions included in the HF-signal being provided by the main beam, which distortions can be understood as crosstalk generated by the pit structure of the adjacent tracks. The signal processing is done e.g. within a microprocessor included in the apparatus. In a preferred embodiment, the apparatus includes a first bit detector for calculating a data stream in response to the first and third satellite beams and corresponding to the pit/land structure of the preceding track, and a second bit detector for calculating a data stream in response to the second and fourth satellite beams and corresponding to the pit/land structure of the subsequent track, with regard to the track, on which the main beam is focused. The data streams of the adjacent tracks are processed each in a digital filter and then subtracted from the data signal of the main beam to eliminate the crosstalk signals or at least to reduce the crosstalk signals from the adjacent tracks.

The adjacent tracks provide in particular considerable crosstalk signals, when the track pitch between adjacent tracks is below the diffraction limit of the pickup, which corresponds to a track pitch being smaller than the beam spot of the main beam as generated by the pickup on a track on the optical disc.

In a preferred embodiment, the radial offset of the satellite beams with regard to the main beam is a track pitch of ¾ or ⅝ between adjacent tracks, wherein TP is the track pitch between adjacent tracks. In another preferred embodiment, the radial offset of the satellite beams with regard to the main beam is a track pitch of 1 TP, and wherein a differential phase detection tracking method is used for tracking of the pickup. The track pitch between adjacent tracks of the optical disc is advantageously below the diffraction limit of the pickup.

The apparatus is in particular useful for high data storage applications when using a pickup utilizing a blue laser diode as the laser.

BRIEF DESCRIPTION OF THE DRAWINGS

Preferred embodiments of the invention are explained in more detail below by way of example with reference to schematic drawings, which show:

FIG. 1 a prior art detector unit with a main detector and two satellite detectors of a pickup for providing a RF data signal and a tracking error signal, FIGS. 2a, 2b application of a prior art pickup providing a high beam intensity sufficient for providing a super-resolution effect on a respective optical disc, FIG. 3 application of a pickup according to the invention generating a main beam and four satellite beams on a super-resolution optical disc, FIG. 4 the structure of a preferred embodiment of a pickup according to the invention, FIG. 5 a Wollaston prism for splitting a laser beam into two orthogonal polarisation components, FIG. 6 details of two detector units as used in a pickup in accordance with FIG. 4, FIG. 7 crosstalk contributions from adjacent tracks induced during read-out of a data track, FIG. 8 signal processing components according to a preferred embodiment the invention, FIG. 9 a second satellite beam following a first satellite beam on a track, FIG. 10 simulation results for data signals provided by a super-resolution beam and by a diffraction limited beam focused onto a single track, and FIG. 11 the difference signal of the data signals as provided by the beams according to FIG. 10.

PREFERRED EMBODIMENTS OF THE INVENTION

Figure 3:
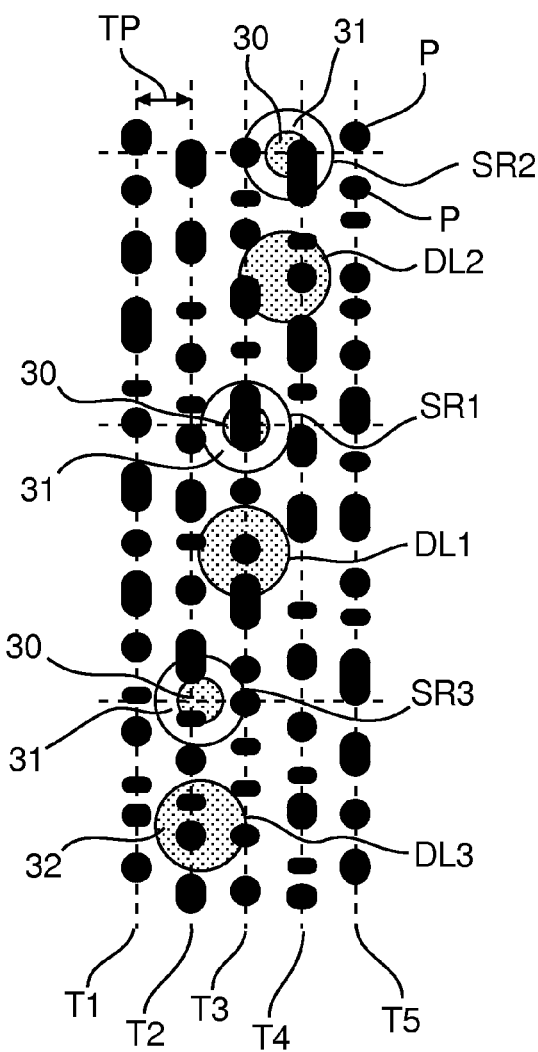

With regard to FIG. 1, the principle of a 3-beam tracking method is explained for an apparatus comprising a pickup with a laser, an objective lens and a detector unit, as known from prior art. The pickup provides a main beam 1 for reading a data signal from a track T2 of an optical disc and two satellite beams 2 and 3 for providing a tracking error signal for a tracking control of the pickup.

As shown in FIG. 1a in a simplified manner, the optical disc comprises three essentially parallel tracks T1, T2, T3 with pits P, which provide a high frequency (HF) data signal, when read by the pickup. The tracks T1-T3 are each separated from one another by a track pitch TP. The beams 1, 2, 3 moves in a tangential direction for reading the data signal of a respective track, here track T2, in accordance with the rotating speed of the optical disc. The tracking control is performed in radial direction, for keeping the main beam 1 in the centre of the respective pits of track T2.

The three beams 1-3 can be generated in the pickup for example by means of a diffractive grating or a grating lens, as well known by a person skilled in the art. The grating means divides the light beam, as emitted from the laser within the pickup, into three respective beams, the main beam 1 and the two satellite beams 2 and 3. The satellite beams 2, 3 are slightly separated from the main beam in the tangential direction, satellite beam 2 being ahead and satellite beam 3 being behind with regard to the position of the main beam 1.

In addition, the satellite beams 2, 3 are shifted in the radial direction with regard to the main beam 1, for example by ¼ track pitch TP, when the main beam 1 is positioned precisely on a respective track. The satellite beam 2 ahead of the main beam 1 is shifted for example by ¼ track pitch to the inner side of the optical disc and the satellite beam 3 is shifted by ¼ track pitch to the outer side of the optical disc with regard to the main beam 1.

For a detection of the reflected light of the three beams 1-3 from the optical disc, the pickup comprises a photodetector 10 within the detector unit for detecting the light reflected from the main beam 1, and two photodetectors 11, 12 for detecting the reflected light of the satellite beams 2 and 3. The detectors 11, 12 are shifted, respectively positioned away from the detector 10 in correspondence with the satellite beams 2, 3 such that optical elements as included in the pickup concentrate the reflected light from the satellite beam 2 on the photodetector 11 and from the satellite beam 3 on the photodetector 12.

The photodetector 10 is divided into four segments A-D, which output signals are combined in an adding circuit 15 for providing an electrical output signal. The sum signal of the adding circuit 15 is amplified by an amplifier 13 of a preamplifier 4 for providing a modulated high frequency data signal RF, also called RF signal or HF read-out signal.

The signals from the photodetectors 11, 12 are subtracted, also amplified, by a subtracting amplifier 14 of the preamplifier 4 for providing a tracking error signal TE. The tracking error signal TE is zero, when the main beam 1 is on track of a respective track, and is positive or negative depending on the radial shift of the pickup with regard to the respective track, from which the data are read. A pickup of this kind is described for example in U.S. Pat. No. 6,510,112 B1.

In FIGS. 2a, 2b, in a simplified manner a small area of an optical storage medium comprising a nonlinear layer for providing a super-resolution effect (Super-RENS) is shown, the storage medium having tracks with pits P. Shown are tracks T1-T3, having a track pitch TP being lower than the diffraction limit of an pickup, as included in a respective apparatus for reading data from or writing data to the optical storage medium. The track pitch TP is in particular lower than the diffraction limit of a Blu-ray pickup comprising a blue laser diode.

The pickup of the apparatus as described with regard to FIG. 1 provides a main beam M and two satellite beams S1, S2; one satellite beam, for example satellite beam S1, being ahead of the main beam M and the second satellite beam, for example satellite beam S2, being behind the main beam M. The track offset of the satellite beams S1, S2 is for example ¼ of the track pitch TP, as shown in FIGS. 2a, 2b. The satellite beams S1, S2 therefore partly overlap with the pits P of the middle track T2, on which track the main beam M is focused.

For reading data from the optical storage medium, the pickup provides a high read power for the main beam M and also for the two satellite beams S1, S2, sufficiently high to provide a super-resolution effect for all three beams M, S1, S2, as shown in FIG. 2b. The sensitivity for the tracking regulation is considerably improved therefore, as compared with FIG. 2a. As shown in FIG. 2b, the effective inner area 20 in which the super-resolution effect takes place, is much smaller than the total area 21 of the satellite beams S1, S2. In case the track offset of the satellite beams S1, S2 with regard to the main beam M is ¼ track pitch, an essential part of the effective spot size 20 overlaps with the pits P of the track T2 and an essential part of the effective spot size 20 is sensitive to the region between the pits P of tracks T1, T2 or T2, T3, and therefore a very sensitive tracking signal can be obtained with the 3-beam method for such kind of a super/resolution optical storage medium.

For a low read power, below the threshold power for providing the super-resolution effect of a respective Super-RENS storage medium, the spot sizes of the main beam M and the satellite beams S1, S2 are comparatively large with regard to the pit width, as shown in FIG. 2a. In this case, the tracking regulation would be less sensitive, as compared with satellite beams S1, S2 using a high power in accordance with FIG. 2b.

According to the invention, in addition to the three beams using the super-resolution effect for generating the tracking signal as explained with regard to FIG. 2b, at least two additional beams are generated by the pickup: as shown for a preferred embodiment in FIG. 3, three beams DL1, DL2 and DL3 are generated in addition to beams SR1, SR2, SR3 and focused onto an optical disc. A third satellite beam DL2 follows a first satellite beam SR2 and a fourth satellite beam DL3 follows a second satellite beam SR3. In addition, a second main beam DL1 follows a first main beam SR1, the second main beam DL1 has no track of that with regard to the first main beam SR1.

The first and the third satellite beams SR2, DL2 have in this embodiment a positive track offset of +¾ track pitch TP and the second and fourth satellite beams SR3, DL3 have a negative track offset of −¾ TP with regard to the track of the main beam SR1. The first main beam SR1 and the first and second satellite beams SR2, SR3 have a light intensity provided by the laser of the pickup being sufficient for providing a super-resolution effect on the optical disc, such, that within an inner area 30 the super-resolution effect takes place, which inner area is much smaller than the total area 31 of the beams SR1, SR2, SR3. The diameter of the inner area 30 is for example similar to the width of the pits P. For the second main beam DL1 and the third and fourth satellite beams DL2, DL3, the light intensity is lower such, that no super-resolution effect takes place on the optical disc. The diameter of the areas 32 of the beams DL1-DL3 is therefore comparable with the areas 31.

The beams DL1, DL2, DL3 utilize therefore only the diffractive effect for recognizing the pit structure of the tracks of the optical disc, of which optical disc in FIG. 3 only tracks T1-T5 are shown for the sake of simplification. Because the satellite beams SR2, SR3 utilize the super-resolution effect for tracking, the track pitch TP between adjacent tracks can be reduced below the diffraction limit of the pickup, which is e.g. 320 nm for a Blu-ray type pickup utilizing a laser diode having a wavelength of 405 nm, in correspondence with the prior art apparatus described with regard to FIG. 2b.

In this embodiment, the first and the third satellite beams SR2, DL2 are preceding the first and second main beams SR1, DL1, and the second and fourth satellite beams SR3, DL3 are following the first and second main beams SR1, DL1. The main beams SR1, DL1 are focused on track T3. Satellite beams SR2, DL2 are focused correspondingly on track T4 and satellite beams SR3, DL3 on track T2. The offset of ¾ TP is preferred according to the invention with regard to the track pitch of ¼ TP, because with this arrangement, the satellite beams are sensitive to the adjacent tracks T2, T4 with regard to the track of the main beam T3: the satellite beams SR2, DL2 are sensitive to the pit structure of track T4 and the satellite beams SR3, DL3 are sensitive to the pit structure of track T2. Alternatively, an offset of ⅝ TP would provide a similar result as the offset ¾ TP. Also, an offset of 1 TP may be used, as described later.

Figure 4:
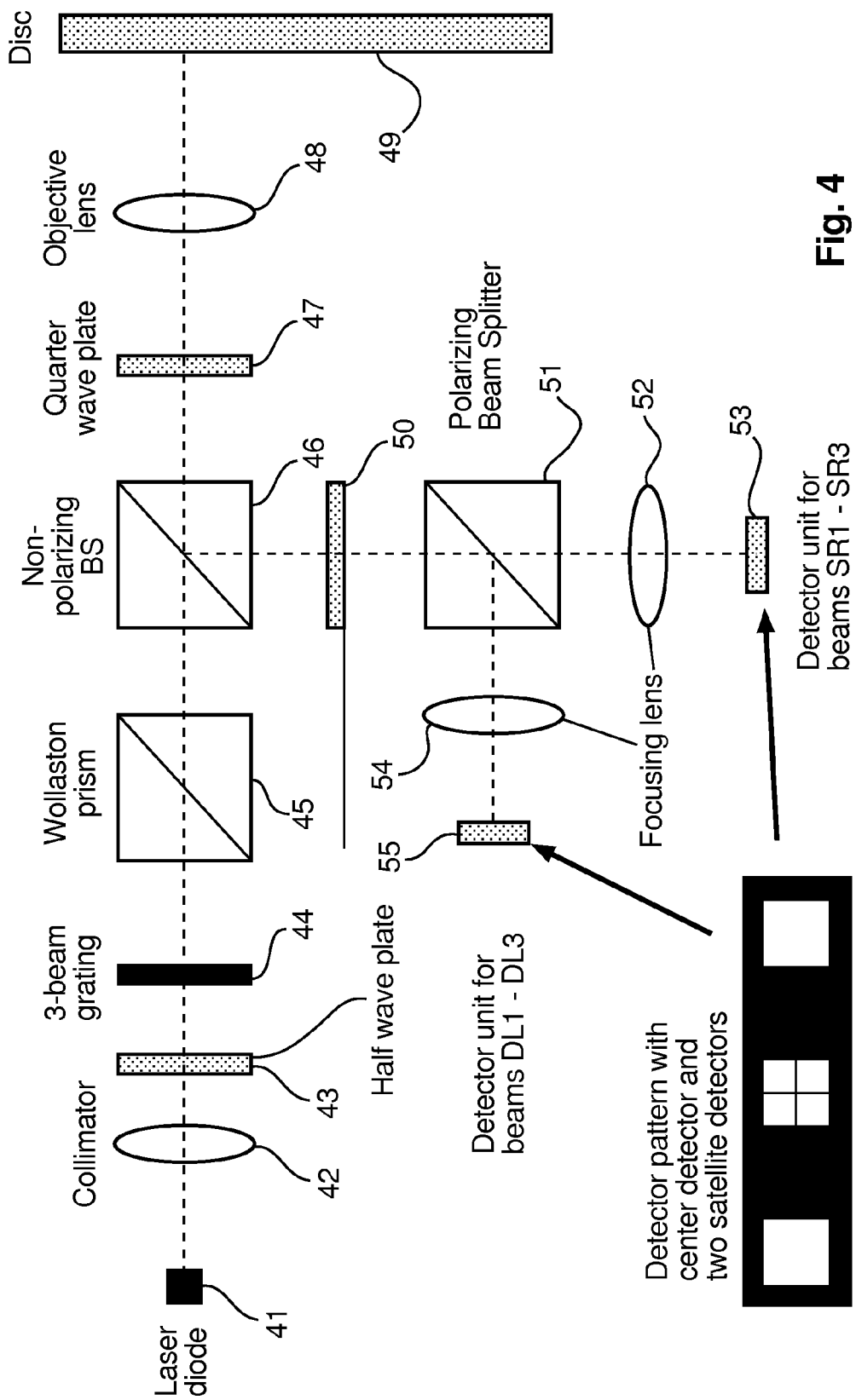

An optical pickup for generating the two main beams and the four satellite beams as described with regard to FIG. 3 and for detecting the corresponding reflected signals of the six beams is described now with regard to FIG. 4: a collimated laser beam is generated by means of a laser diode 41 and a collimator 42 and passes a half-wave plate 43, which is used to adjust the polarisation direction of the collimated laser beam. Then, two satellite beams are generated in addition to a main beam by means of a diffractive grating 44. The diffractive grating 44 is used to generate two satellite beams having a light intensity of about 70% to 100% with regard to the main beam, which is sufficient for enabling the super-resolution effect for the two satellite beams on the optical disc.

After the diffractive grating 44 follows a beam splitting element 45, for example a Wollaston prism, which splits each of the three beams into two beams having orthogonal linear polarisation components. The diffractive grating 44 and the beam splitting element 45 are dimensioned such, that the satellite beams have a track offset of ¾ TP on the optical disc in relation to the main beam, as described with regard to FIG. 3. In addition, the diffractive grating 44 and the beam splitting element 45 are dimensioned such, that the diffraction limited beams DL1-DL3 have each a separation of 2-10 micrometer on the data layer of the optical disc with regard to the super-resolution beams SR1-SR3.

After the beam splitting element 45, the six beams pass a non-polarizing beam splitter 46 followed by a quarter-wave plate 47 arranged between the non-polarizing beam splitter 46 and a super-resolution optical disc 49, which quarter-wave plate 47 is adjusted such that the linear polarization states of the six beams are converted into left and right handed circular polarization. An objective lens 48 is arranged between quarter-wave plate 47 and optical disc 49 for focusing the six beams onto respective tracks of the data layer of the optical disc 49.

In another embodiment, the quarter-wave plate 47 is replaced by a half-wave plate to keep the linear polarization and to adjust the polarization direction with respect to the tracks of the optical disc 49. In this case the intensity distribution of the focused beams is non-rotational symmetric and the detected signals depend on the angle between polarization and the track direction.

Figure 5:
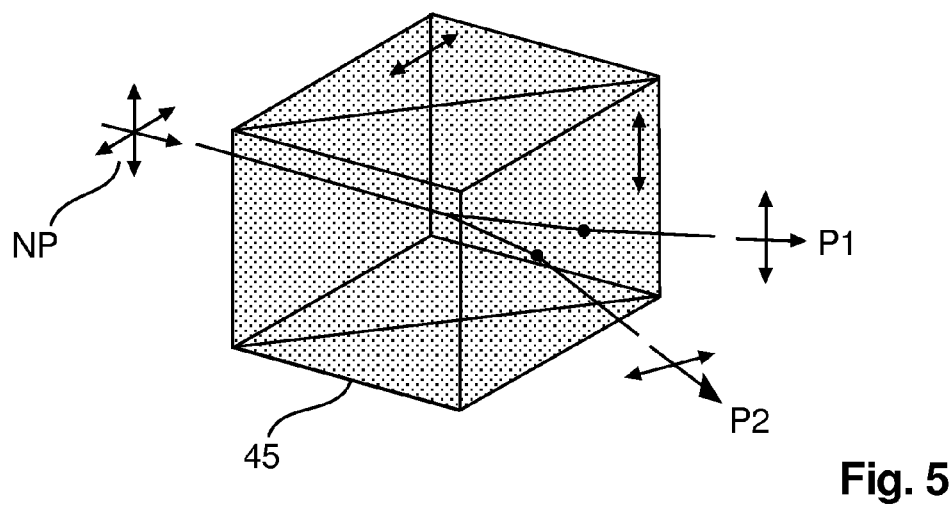

A Wollaston prism usable for the pickup as described with regard to FIG. 4 is shown in FIG. 5: if a beam of non-polarised light NP enters the Wollaston prism 45, the light NP is separated into two orthogonal, linear polarized components P1, P2, which leave the Wollaston prism 45 at separate locations and under different angles. When a Wollaston prism is used with small divergence angles, the diffraction limited beams DL1-DL3 can be generated such that they are separated by a small distance within a range of 2 µm to 10 µm with regard to the super-resolution beams SR1-SR3, and with orthogonal linear polarization with regard to the super-resolution beams SR1-SR3.

When a linear polarized beam enters the Wollaston prism 45, the intensity of the polarization components P1, P2 can be adjusted with regard to the polarization angle of the polarized light entering the Wollaston prism 45. The divergence angles of the polarized beams P1, P2 can be calculated due to the geometrical and optical parameters of the Wollaston prism 45. Therefore, by a respective adjustment of the half-wave plate 43, it can be guaranteed that have a light intensity being below the threshold for providing the super-resolution effect on the optical disc 49, and that the super-resolution beams SR1-SR3 have orthogonal polarization with regard to the beams DL1-DL3 and a laser power above the threshold for providing the super-resolution effect. Alternatively, also other optical elements can be used instead of the Wollaston prism 45, e.g. liquid crystal elements or diffractive gratings.

The beam pattern generated by the pickup as described with regard to FIG. 4 on the data layer of the optical disc 49 is shown in FIG. 3, wherein the super-resolution beams SR1-SR3 have an orthogonal polarization with regard to the diffraction limited beams DL1-DL3, e.g. beams SR1-SR3 have left-handed circular polarization and beams DL1-DL3 have right-handed circular polarization generated by the quarter-wave plate 47, as described above.

The left- and right-handed circular polarized beams reflected from the optical disc 49 are collected by the objective lens 48 and pass through the quarter-wave plate 47, which converts the circular polarization states into orthogonal, linear polarization states. Then, the non-polarizing beam splitter 46 directs the reflected signals to a polarizing beam splitter 51, which is used to separate the reflected signals of the super-resolution beams SR1-SR3 from the signals of the diffraction limited beams DL1-DL3. In addition, a half-wave plate 50 may be used to optimize the linear polarization of the reflected beams with regard to the position of the polarizing beam splitter 51. Finally, the signals of the super-resolution beams SR1-SR3 pass the polarizing beam splitter 51 and are focused by a focusing lens 52 onto a first detector unit 53, and the signals of diffraction limited beams DL1-DL3 are directed by the polarizing beam splitter 51 onto a focusing lens 54 and are focused onto a second detector unit 55. The detector units 53, 55 comprise each a four quadrant detector for the respective main beam and two single detectors for the respective satellite beams, as indicated in FIG. 4.

It has to be taken into consideration that depolarization effects may occur due to the interaction of the polarized light with the pits on the optical disc 49. As a consequence, the efficiency of the polarizing beam splitter 51 is reduced. Therefore, beams with wrong polarization but low intensity will reach the proximity of the detector units 53, 55. However, the detector units 53, 55 are constructed such, that due to the geometrical separation of the diffraction limited beams DL1-DL3 with regard to the super-resolution beams SR1-SR3 on the optical disc, this parasitic light will not reach the effective detector areas within the detector units 53, 55, as explained now with regard to FIG. 6, which shows the detector units 53, 55 in more detail.

Figure 6:
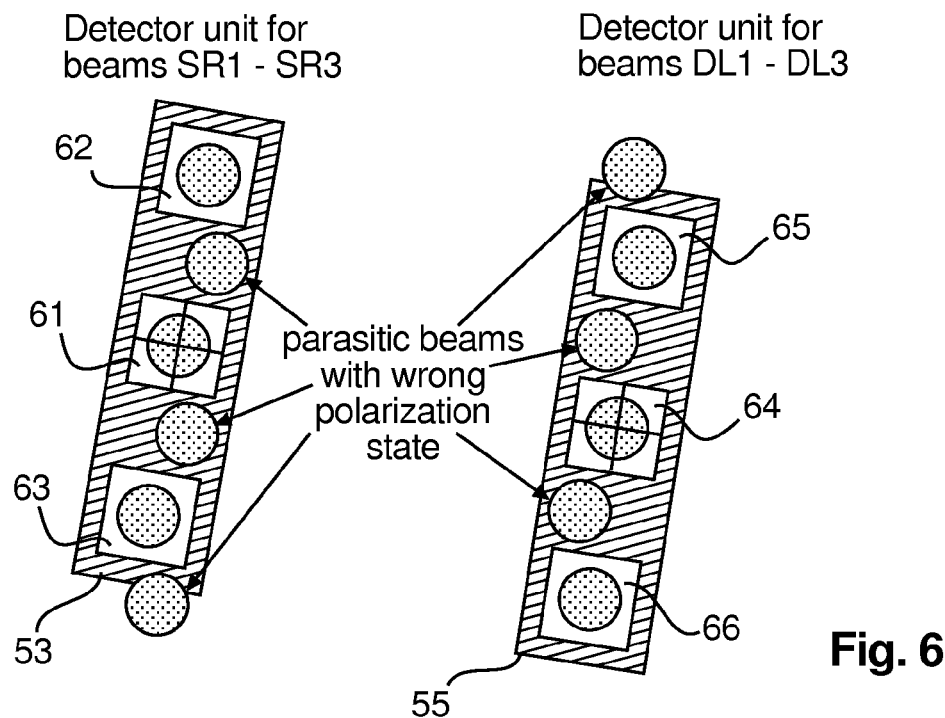

The detector unit 53 is dimensioned and arranged such within the pickup, that the reflected first main beam SR1 is focused onto a four quadrant detector 61, the reflected satellite beam SR2 onto a single detector 62 and the reflected satellite beam SR3 onto a single detector 63. The detector unit 55 is dimensioned and arranged such within the pickup, that the reflected second main beam DL1 is focused onto a four quadrant detector 64, the reflected satellite beam DL2 onto a single detector 65 and the reflected satellite beam DL3 onto a single detector 66. Because of the geometrical separation of the diffraction limited beams DL1-DL3 with regard to the super-resolution beams SR1-SR3 on the optical disc, reflected parasitic beams with wrong polarisation state do not reach sensitive detector areas, as indicated in FIG. 6.

The optical detectors 61-66 generate electrical signals, which are labelled for simplification in correspondence with the optical beams: the electrical signals generated by the super-resolution beams SR1-SR3 are called S-SR1, S-SR2 and S-SR3, and the electrical signals generated by the diffraction limited beams DL1-DL3 are called S-DL1, S-DL2 and S-DL3. The tracking signal for keeping the pickup onto a respective track for reading of the data is generated by the satellite beams as explained before with regard to the EP-B-2009627. The focus error signal for the focus servo can be generated by an electrical signal as provided by the first or second main beam SR1, DL1, e.g. by using the astigmatic method.

For present super-resolution optical discs, the super-resolution effect as provided by the nonlinear layer cannot completely suppress the diffraction limited signal due to the comparatively small thickness of the nonlinear layer and limited changes in the refractive index of the nonlinear layer material and increased laser power. Correspondingly, even the signal S-SR1 of the super-resolution spot of the first main beam SR1 contains a significant signal contribution which is limited by diffraction. Especially for smaller track pitch TP, e.g. TP<300 nm for a Blu-ray type pickup, the diffraction limited signal contains significant contributions from adjacent tracks, which can be understood as crosstalk due to the pit structure of the adjacent tracks. As a consequence, the signal S-SR1 is disturbed by the diffraction limited signal from the adjacent tracks.

Figure 7:
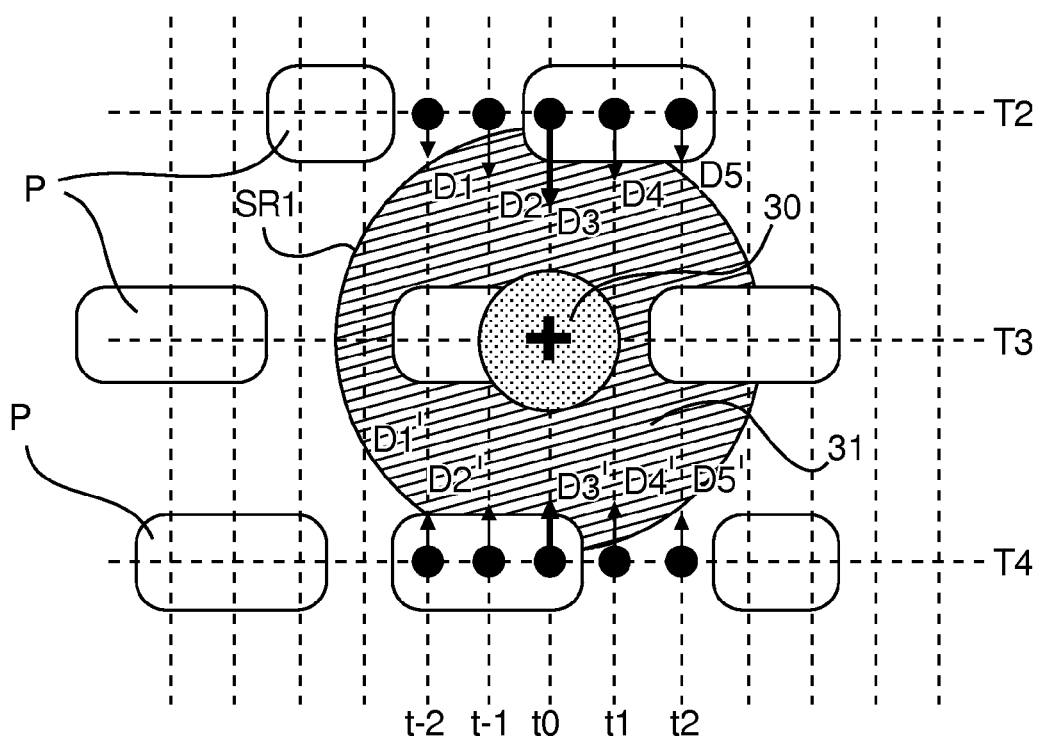

This effect is explained in more detail with regard to FIG. 7, which shows crosstalk contributions from adjacent tracks T2, T4, induced during read-out of the data of a track T3 by the pit structure of the adjacent tracks T2, T4. The main beam SR1 is focused on track T3 at a sampling point t0. The main beam SR1 comprises an inner area 30 for which the super-resolution effect takes place, which covers about the width of the pits of the track T3, but the total area 31 of main beam SR1 covers not only the pits P of track T3, but partly also pits P of the adjacent tracks T2, T4. The pits of tracks T2,T4 provide therefore signal contributions D3, D3' to the signal S-SR1 of the first main beam SR1. For sampling points t-2; t-1, the signal contributions of the adjacent tracks are correspondingly D1, D1'; D2, D2', and for the sampling points t1; t2, the signal contributions are D4, D4'; D5, D5', as indicated by arrows for the respective sampling point of the adjacent tracks. The magnitude and the type of the crosstalk contributions depend on the distance to the read-out spot, the spot profile of the total area 31 of main beam SR1, and on the pit structure of the adjacent tracks T2, T4, e.g. whether there is a pit or a land within the total area 31 of main beam SR1.

Figure 8:
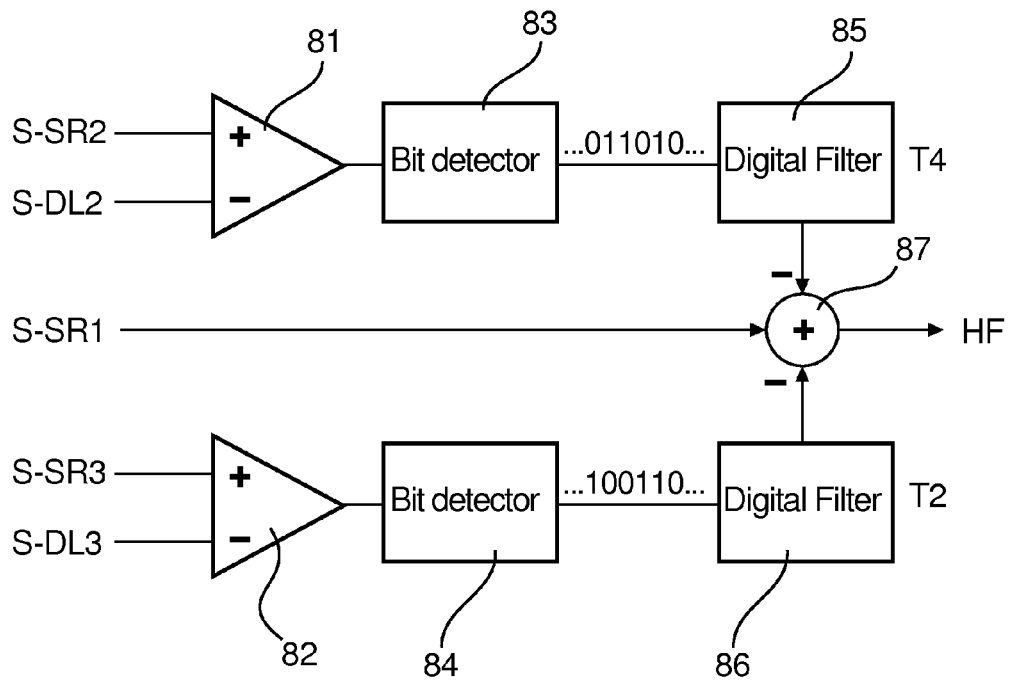

To cancel or at least to reduce the distortions of the signal S-SR1 generated by the adjacent tracks, the invention uses advanced signal processing, as shown in FIG. 8. The signal processing is applied in this embodiment to the tracks as shown in FIG. 7, wherein the main beam SR1 is focused on track T3, the first and third satellite beams SR2, DL2 on track T4 and the second and fourth satellite beams SR3, DL3 on track T2, in correspondence with FIG. 3. The satellite beams SR2, DL2 generate respective electrical signals S-SR2, S-DL2 according to the pit structure of track T4, and the satellite beams SR3, DL3 generate electrical signals S-SR3, S-DL3 according to the pit structure of track T2. The signal processing is done for example within a microprocessor included in the apparatus.

For track T4, the signals S-SR2 and S-DL2 are subtracted in a first subtractor 81, and the signals S-SR3, S-DL3 of track T2 are subtracted in a second subtractor 82. For these substractions, the geometrical offsets in track direction of satellite beams SR2 and SR3 with regard to the beams DL2, DL3 has to be taken into account by including a respective time delay. The signals of subtractors 81, 82 correspond then only to the part of the signal which is read by the super-resolution effect of the satellite beams, which signals are analysed by a bit detector 83 for track T4 to calculate the bit stream for track T4 and by a bit detector 84 for track T2 to calculate the bit stream for the track T2.

The bit stream of bit detector 83 is processed in a next step in digital filter 85 and the bit stream of bit detector 84 is processed in a digital filter 86, to calculate the signal contributions of the adjacent tracks for the signal S-SR1 of the first main beam, e.g. the signal contributions D3, D3' of tracks T2, T4 for sampling point t0, and correspondingly also signal contribution D4, D4' for sampling point t1, signal contribution D5, D5' for sampling point t2 and so on, as indicated in FIG. 7. The signal contributions of the adjacent tracks are then substracted from the signal S-SR1 in a third subtractor 87, to obtain a HF data signal HF, which is essentially free of crosstalk contributions from adjacent tracks.

The coefficients of the digital filters 85, 86 correspond to the different distortions induced by the pits of the adjacent tracks and can be determined by measuring or simulations. The advantage of using such filters 85, 86 is a flexibility to adapt the coefficients to different given conditions, e.g. different track pitch or different beam spot profile.

Figure 9:
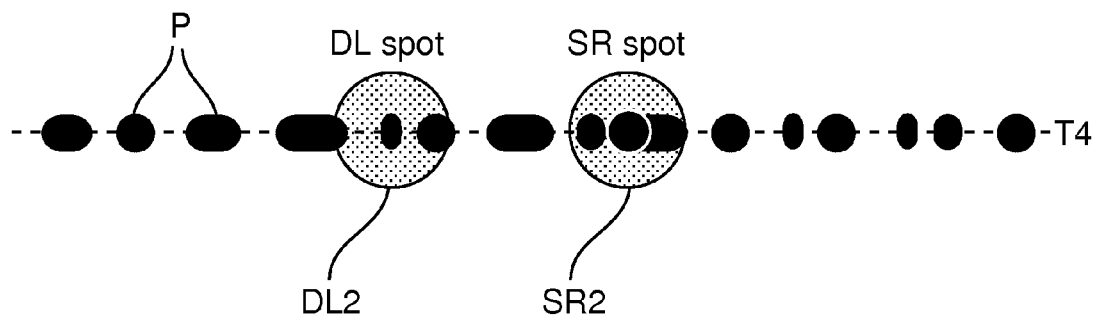

The mechanism to determine the bit stream for an adjacent track is explained in addition with regard to FIG. 9, which shows the track T4 on which the first and third satellite beams as SR2, DL2 are focused. Beams SR2, DL2 are therefore sensitive to the pit structure with pits P of the track T4, and by subtracting the electrical signals S-SR2 from S-DL2 by taking into account the delay induced by the geometrical offset in track direction between beams SR2, DL2, the resulting signal corresponds then only to the part of the signal which is generated by the super-resolution effect. Also a simple slicer could deliver sufficiently accurate results. Of course a slicer would be less robust against noise, but this would affect only the short pits while the detection of the long pits is more important for crosstalk cancellation.

FIG. 9 shows an embodiment, where the offset of the satellite beams with regard to the main beams SR1, DL1 is not ¾ TP, but 1 TP. Satellite beams SR2, DL2 are therefore centered on track T4 when the main beams SR1, DL1 are centered on track T3. For generating the tracking signal, a differential phase detection (DPD) tracking method has be used for this embodiment. Due to the satellite beams, differential phase detection tracking can be used then not only for the main beam, but also for the satellite beams. Obviously, the respective satellite detectors have to be four quadrant detectors.

Figure 10:
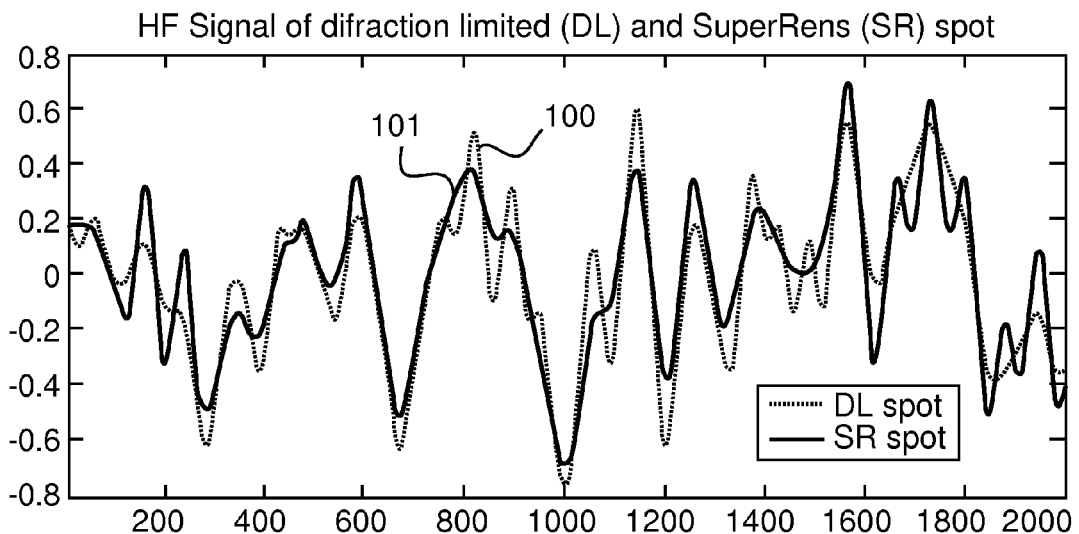
Figure 11:
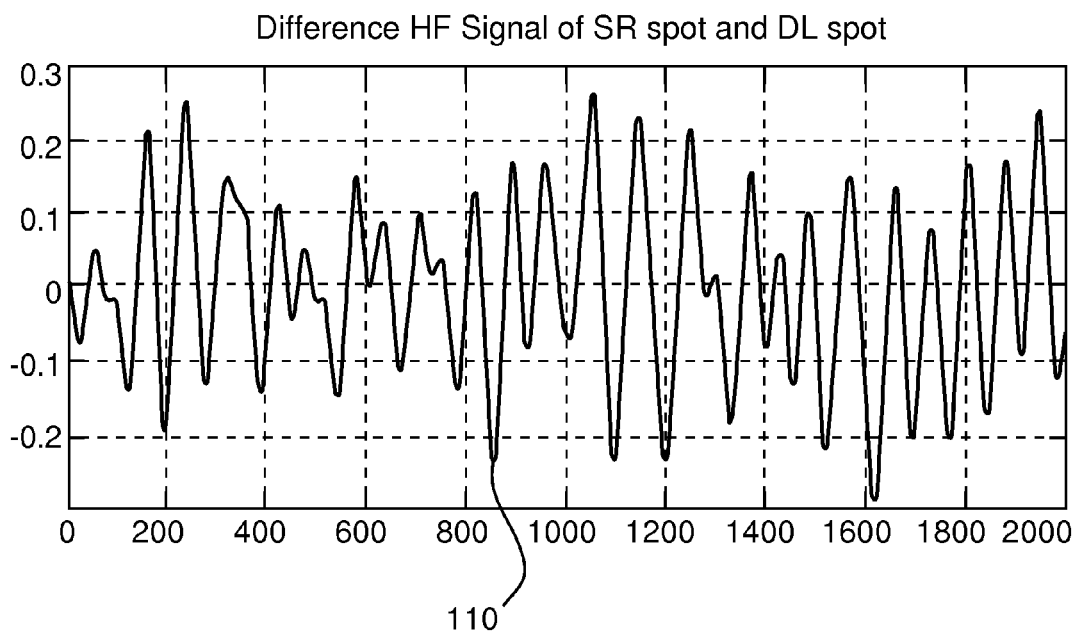

Simulation results for a single track are shown in FIG. 10, corresponding with the embodiment according to FIG. 9. Graph 100 shows the signal for the super-resolution satellite beam SR2 and graph 101 the electrical signal for the diffraction limited satellite beam DL2. Graph 101 has been corrected for the delay and overlaid with graph 100, so that it can be seen how the signals of satellite beams SR2, DL2 respond to the pit structure of track T4. Because satellite beam DL2 does not utilize the super-resolution effect, graph 101 contains less higher frequency contributions with regard to the graph 100. The resulting difference signal 110 for graphs 100, 101 is shown in FIG. 11.

The apparatus of the present invention allows therefore tracking on super-resolution optical discs, on which the track pitch between adjacent tracks is below the diffraction limit of the pickup by providing an enhanced signal-to-noise ratio of the HF data signal by suppressing crosstalk effects from adjacent tracks.

Also other embodiments of the invention can be made by a person skilled in the art without departing from the scope of the present invention. The invention is in particular not limited to a pickup comprising a Blu-Ray disc type pickup or to any specific material of the nonlinear layer. The invention is also applicable to recording of data on recordable super-resolution optical discs. The invention resides therefore in the claims herein after appended.

The invention claimed is:

1. Apparatus comprising a pickup for reading data from a super-resolution optical disc,
   the pickup comprising a laser for generating a main beam and a first and a second satellite beam, the two satellite beams having each a radial offset with regard to the main beam,
   the two satellite beams and the main beam being focused by an objective lens onto the optical disc and the reflected light from the optical disc being guided onto two detector units for providing a HF data signal, wherein the pickup generates
   a third satellite beam following the first satellite beam, having the same radial offset as the first satellite beam,
   a fourth satellite beam following the second satellite beam, having the same radial offset as the second satellite beam, for providing a crosstalk correction of the HF data signal;
   the two detector units include a first detector unit being sensitive for the main beam and the first and second satellite beams, but not for the third and fourth satellite beams, and a second detector unit being sensitive for the third and fourth satellite beams, but not for the main beam and the first and second satellite beams; and the pickup comprises a diffractive grating for generating in addition two beams from a beam generated by the laser, a beam splitting element for splitting each of the three beams generated by the diffractive grating into two beams having orthogonal polarization states, a non-polarizing beam splitter directing reflected signals from the optical disc to a polarizing beam splitter, which is arranged for directing reflected light of the main beam and the first and second satellite beams to the first detector unit and for directing reflected light of the third and fourth satellite beams to the second detector unit.

2. The apparatus of claim 1, wherein the track pitch between adjacent tracks of the optical disc is below the diffraction limit of the pickup.

3. The apparatus of claim 1, wherein the light intensity of each of the first and second satellite beams and of the main beam is sufficient to provide a super-resolution effect on the optical disc and the light intensity of each of the third and fourth satellite beams is not sufficient to provide a super-resolution effect.

4. The apparatus of claim 3, wherein the light intensity of the first and second satellite beams is each in the order of 70 to 100% of the intensity of the main beam, and wherein the light intensity of the third and fourth satellite beams is each smaller than 70% of the intensity of the main beam.

5. Apparatus according to claim 1, wherein the first and third satellite beams are focused onto an adjacent track preceding the track, on which the main beam is focused, and wherein the second and fourth satellite beams are focused onto an adjacent track following the track, on which the main beam is focused.

6. Apparatus according to claim 1, wherein the radial offset of the satellite beams with regard to the main beam is a track pitch of ¾ or ⁵⁄₄ TP, TP being the track pitch between adjacent tracks.

7. Apparatus according to claim 1, wherein the radial offset of the satellite beams with regard to the main beam is a track pitch of 1 TP, TP being the track pitch between adjacent tracks, and wherein a differential phase detection tracking method is used for tracking of the pickup.

8. Apparatus according to claim 1, comprising a microprocessor to reduce crosstalk included in the data signal provided by the main beam, the microprocessor including a first bit detector for calculating a data stream in response to the first and third satellite beams and corresponding to the pit/land structure of the preceding track, and a second bit detector for calculating a data stream in response to the second and fourth satellite beams and corresponding to the pit/land structure of the subsequent track, with regard to the track, on which the main beam is focused.

9. Apparatus according to claim 1, comprising a first subtractor and a first bit detector for calculating a data stream in response to the first and third satellite beams corresponding to the pit/land structure of a preceding track, with regard to a track, on which the main beam is focused, a second subtractor and a second bit detector for calculating a data stream in response to the second and fourth satellite beams corresponding to the pit/land structure of the subsequent track, a first digital filter for processing the data stream of the first bit detector, a second digital filter for processing the data stream of the second bit detector, and a third subtractor for subtracting the signal contributions of the adjacent tracks as provided by the first and second digital filters from the signal of the first main beam, for reducing the crosstalk signals originating from the adjacent tracks.

10. An apparatus, comprising a pickup for reading data from a super-resolution optical disc, a track pitch between adjacent tracks of the optical disc being below a diffraction limit of the pickup, the pickup comprising:

a laser for generating a main beam and a first and a second satellite beam, the two satellite beams having each a radial offset with regard to the main beam, the two satellite beams and the main beam being focused by an objective lens onto the optical disc and the reflected light from the optical disc being guided onto two detector units for providing a HF data signal, wherein the pickup generates a third satellite beam following the first satellite beam, having the same radial offset as the first satellite beam;

a fourth satellite beam following the second satellite beam, having the same radial offset as the second satellite beam, for providing a crosstalk correction of the HF data signal; and the light intensity of each of the first and second satellite beams and of the main beam being sufficient to provide a super-resolution effect on the optical disc and the light intensity of each of the third and fourth satellite beams is lower with regard to the first and second satellite beams and is not sufficient to provide a super-resolution effect.

11. The apparatus of claim 10, wherein the light intensity of the first and second satellite beams is each in the order of 70 to 100% of the intensity of the main beam, and wherein the light intensity of the third and fourth satellite beams is each smaller than 70% of the intensity of the main beam.

12. The apparatus of claim 10, wherein the first and third satellite beams are focused onto an adjacent track preceding the track, on which the main beam is focused, and wherein the second and fourth satellite beams are focused onto an adjacent track following the track, on which the main beam is focused.

13. The apparatus of claim 10, wherein the radial offset of the satellite beams with regard to the main beam is a track pitch of ¾ or ⁵⁄₄ TP, TP being the track pitch between adjacent tracks.

14. The apparatus of claim 10, wherein the radial offset of the satellite beams with regard to the main beam is a track pitch of 1 TP, TP being the track pitch between adjacent tracks, and wherein a differential phase detection tracking method is used for tracking of the pickup.

15. The apparatus of claim 10, comprising a microprocessor to reduce crosstalk included in the data signal provided by the main beam, the microprocessor including a first bit detector for calculating a data stream in response to the first and third satellite beams and corresponding to the pit/land structure of the preceding track, and a second bit detector for calculating a data stream in response to the second and fourth satellite beams and corresponding to the pit/land structure of the subsequent track, with regard to the track, on which the main beam is focused.

16. The apparatus of claim 10, comprising:

a first subtractor and a first bit detector for calculating a data stream in response to the first and third satellite beams corresponding to the pit/land structure of a preceding track, with regard to a track, on which the main beam is focused;

a second subtractor and a second bit detector for calculating a data stream in response to the second and fourth satellite beams corresponding to the pit/land structure of the subsequent track, a first digital filter for processing the data stream of the first bit detector, a second digital filter for processing the data stream of the second bit detector; and a third subtractor for subtracting the signal contributions of the adjacent tracks as provided by the first and second digital filters from the signal of the first main beam, for reducing the crosstalk signals originating from the adjacent tracks.

* * * * *

UNITED STATES PATENT AND TRADEMARK OFFICE
CERTIFICATE OF CORRECTION

PATENT NO. : 8,630,154 B2  
APPLICATION NO. : 13/697075  
DATED : January 14, 2014  
INVENTOR(S) : Herbert Hoelzemann et al.

Page 1 of 1

It is certified that error appears in the above-identified patent and that said Letters Patent is hereby corrected as shown below:

Title Page

Item (73) Assignee: should read --Thomson Licensing--.

Signed and Sealed this
Second Day of February, 2016

Michelle K. Lee
*Director of the United States Patent and Trademark Office*